US010480956B2

(12) United States Patent
Leblanc

(10) Patent No.: US 10,480,956 B2
(45) Date of Patent: *Nov. 19, 2019

(54) METHOD AND SYSTEM FOR DISPLAYING NOWCASTS ALONG A ROUTE MAP

(71) Applicant: SKY MOTION RESEARCH ULC, Montreal (CA)

(72) Inventor: Andre Leblanc, Mont-Royal (CA)

(73) Assignee: SKY MOTION RESEARCH, ULC, Montreal (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/225,699

(22) Filed: Dec. 19, 2018

(65) Prior Publication Data
US 2019/0120652 A1 Apr. 25, 2019

Related U.S. Application Data

(63) Continuation of application No. 13/922,800, filed on Jun. 20, 2013, now Pat. No. 10,203,219, which is a
(Continued)

(51) Int. Cl.
G01C 21/36 (2006.01)
G08G 1/0968 (2006.01)

(52) U.S. Cl.
CPC ..... *G01C 21/3676* (2013.01); *G01C 21/3691* (2013.01); *G08G 1/096811* (2013.01); *G08G 1/096844* (2013.01)

(58) Field of Classification Search
CPC ....... G01W 1/10; Y02A 90/14; G08G 5/0021; H04W 4/90; H04W 4/02; G01C 21/20; G01C 21/34
See application file for complete search history.

(56) References Cited

U.S. PATENT DOCUMENTS 5,406,481 A 4/1995 Shinozawa et al.
5,574,647 A 11/1996 Liden
(Continued)

FOREIGN PATENT DOCUMENTS

CA 2514868 8/2004
CN 1481512 A 3/2004
(Continued)

OTHER PUBLICATIONS

Wikipedia.org, "Weather forecasting", version published Mar. 12, 2013, retrieved from internet on Mar. 27, 2017 https://web.archive.org.web/20130312014022/http:en.wikipedia.org/wiki/Weather_forecasting> #.
(Continued)

*Primary Examiner* — Nabil H Syed
*Assistant Examiner* — Cal J Eustaquio
(74) *Attorney, Agent, or Firm* — Pillsbury Winthrop Shaw Pittman LLP

(57) ABSTRACT

A system and method for displaying nowcasts along a route on a map. The system receives a map request including a departure location and a destination location from a user, and obtains map data including a route between the destination location and the departure location. A nowcaster is used for outputting nowcasts for a number of key points along the route. The system modifies the map data to include a visual indicator for each nowcast for each key point such that when the modified map data is executed on a display the nowcasts are displayed along the route between the departure location and the destination location.

15 Claims, 11 Drawing Sheets

Related U.S. Application Data continuation-in-part of application No. 13/856,923, filed on Apr. 4, 2013.

(60) Provisional application No. 61/835,626, filed on Jun. 16, 2013, provisional application No. 61/836,713, filed on Jun. 19, 2013.

(56) References Cited

U.S. PATENT DOCUMENTS

| | | |
|---|---|---|
| 5,974,360 A | 10/1999 | Otsuka et al. |
| 6,128,578 A | 10/2000 | Sakaino et al. |
| 6,201,494 B1 | 3/2001 | Kronfeld |
| 6,298,307 B1 | 10/2001 | Murphy et al. |
| 6,317,686 B1 | 11/2001 | Ran |
| 6,360,172 B1 | 3/2002 | Burfeind et al. |
| 6,496,780 B1 | 12/2002 | Harris et al. |
| 6,501,392 B2 | 12/2002 | Gremmert et al. |
| 6,535,817 B1 | 3/2003 | Krishnamurti |
| 6,542,825 B2 | 4/2003 | Jones |
| 6,581,009 B1 | 6/2003 | Smith |
| 6,590,529 B2 | 7/2003 | Schwoegler |
| 6,850,184 B1 | 2/2005 | Desrochers et al. |
| 6,920,233 B2 | 7/2005 | Wolfson et al. |
| 6,961,061 B1 | 11/2005 | Johnson |
| 6,980,908 B2 | 12/2005 | McKewan et al. |
| 6,985,837 B2 | 1/2006 | Moon et al. |
| 7,043,368 B1 | 5/2006 | Cote |
| 7,062,066 B2 | 6/2006 | Wolfson et al. |
| 7,069,258 B1 | 6/2006 | Bothwell |
| 7,082,382 B1 | 7/2006 | Rose |
| 7,181,345 B2 | 2/2007 | Rosenfeld et al. |
| 7,231,300 B1 | 6/2007 | Rose, Jr. |
| 7,321,827 B1 | 1/2008 | Myers |
| 7,379,817 B1 | 5/2008 | Tyson et al. |
| 7,391,358 B2 | 6/2008 | Dupree et al. |
| 7,421,344 B1 | 9/2008 | Marsh |
| 7,472,021 B2 | 12/2008 | Bieringer et al. |
| 7,486,220 B1 | 2/2009 | Kronfeld et al. |
| 7,515,088 B1 | 4/2009 | Woodell et al. |
| 7,542,852 B1 | 6/2009 | Rose et al. |
| 7,558,674 B1 | 7/2009 | Neilley |
| 8,280,633 B1 | 10/2012 | Eldering et al. |
| 8,332,084 B1 | 12/2012 | Bailey et al. |
| 2001/0030624 A1 | 10/2001 | Schwoegler |
| 2001/0049584 A1 | 12/2001 | Jones et al. |
| 2002/0038353 A1 | 3/2002 | Yamamoto |
| 2002/0114517 A1 | 8/2002 | Wolfson |
| 2003/0035860 A1 | 2/2003 | Ando et al. |
| 2003/0193411 A1 | 10/2003 | Price |
| 2004/0010372 A1 | 1/2004 | Schwoegler |
| 2004/0043760 A1 | 3/2004 | Rosenfeld |
| 2004/0143396 A1 | 7/2004 | Allen et al. |
| 2004/0215483 A1 | 10/2004 | Fixman |
| 2005/0197774 A1 | 9/2005 | Egi |
| 2005/0222770 A1 | 10/2005 | McKewon et al. |
| 2006/0015254 A1 | 1/2006 | Smith |
| 2006/0271297 A1 | 11/2006 | Repelli et al. |
| 2006/0287818 A1 | 12/2006 | Okude et al. |
| 2007/0069941 A1 | 3/2007 | Pearlman et al. |
| 2007/0112476 A1 | 5/2007 | Obradovich |
| 2007/0256716 A1 | 11/2007 | Resner |
| 2008/0097701 A1 | 4/2008 | Zawadzki et al. |
| 2008/0201647 A1 | 8/2008 | Lagerstedt et al. |
| 2008/0313037 A1 | 12/2008 | Root et al. |
| 2009/0037100 A1 | 2/2009 | Fujiwara |
| 2009/0088965 A1 | 4/2009 | Burckart et al. |
| 2009/0157294 A1 | 6/2009 | Geelen |
| 2009/0157298 A1 | 6/2009 | Kon |
| 2009/0210353 A1 | 8/2009 | Mitchell et al. |
| 2010/0250581 A1 | 9/2010 | Chau |
| 2011/0054776 A1 | 3/2011 | Petrov et al. |
| 2011/0267224 A1 | 11/2011 | Venkatachalam |
| 2011/0307168 A1 | 12/2011 | Kieff |
| 2012/0147030 A1 | 6/2012 | Hankers et al. |
| 2012/0170030 A1 | 7/2012 | Mihajlovic et al. |
| 2013/0013206 A1 | 1/2013 | Guha et al. |
| 2013/0046459 A1 | 2/2013 | Itakura |
| 2014/0067270 A1 | 3/2014 | Gail |
| 2014/0303893 A1 | 10/2014 | LeBlanc |
| 2014/0368361 A1 | 12/2014 | LeBlanc |
| 2014/0372038 A1 | 12/2014 | LeBlanc |
| 2014/0372039 A1 | 12/2014 | LeBlanc |
| 2014/0379264 A1 | 12/2014 | LeBlanc |
| 2015/0006079 A1 | 1/2015 | LeBlanc |

FOREIGN PATENT DOCUMENTS

| | | |
|---|---|---|
| CN | 101349767 A | 1/2009 |
| CN | 102169194 A | 8/2011 |
| CN | 102809767 A | 12/2012 |
| EP | 1218698 | 7/2002 |
| EP | 1566665 A1 | 8/2005 |
| EP | 2415044 A1 | 2/2012 |
| JP | H05-307080 | 11/1993 |
| JP | H08261854 A | 10/1996 |
| JP | H09096679 A | 4/1997 |
| JP | H11-2539 A | 1/1999 |
| JP | 11-136365 A | 5/1999 |
| JP | H11-014760 A | 5/1999 |
| JP | H11242080 A | 9/1999 |
| JP | 2000193469 A | 7/2000 |
| JP | 2000258174 A | 9/2000 |
| JP | 2001-081711 | 3/2001 |
| JP | 2002099576 A | 4/2002 |
| JP | 2002148061 A | 5/2002 |
| JP | 2002357670 A | 12/2002 |
| JP | 2003030421 A | 1/2003 |
| JP | 2003121172 A | 4/2003 |
| JP | 2003216752 A | 7/2003 |
| JP | 2003300176 A | 10/2003 |
| JP | 2004-028625 | 1/2004 |
| JP | 2004069478 A | 3/2004 |
| JP | 2004170201 A | 6/2004 |
| JP | 2004516462 A | 6/2004 |
| JP | 2004184224 A | 7/2004 |
| JP | 2005-300176 | 10/2005 |
| JP | 2005-316886 A | 11/2005 |
| JP | 2006197106 A | 7/2006 |
| JP | 2006337182 A | 12/2006 |
| JP | 2007047034 A | 2/2007 |
| JP | 2007-163442 A | 6/2007 |
| JP | 2008008776 A | 1/2008 |
| JP | 2008157919 A | 7/2008 |
| JP | 2008203173 A | 9/2008 |
| JP | 2009-025083 A | 2/2009 |
| JP | 2009-108456 | 5/2009 |
| JP | 2009230720 A2 | 10/2009 |
| JP | 2010060444 A | 3/2010 |
| JP | 2010521020 A | 6/2010 |
| JP | 2010-164557 | 7/2010 |
| JP | 2011257149 A | 12/2011 |
| JP | 2012052930 A | 3/2012 |
| JP | 2012126384 A | 7/2012 |
| JP | 05307080 B2 | 10/2013 |
| TW | 200506410 | 2/2005 |
| TW | 201209441 A | 9/2010 |
| TW | 201224502 A | 6/2012 |
| TW | 201231920 A | 8/2012 |
| WO | WO-01/25727 A1 | 4/2001 |
| WO | WO-02/23462 | 3/2002 |
| WO | WO-0249310 A2 | 6/2002 |
| WO | WO-2012062760 A1 | 5/2012 |
| WO | WO-2012/089280 A1 | 7/2012 |
| WO | WO-20140161077 A1 | 10/2014 |
| WO | WO-20140161079 | 10/2014 |

OTHER PUBLICATIONS

Abdulrahman Qhtani, "Weather Spark" viewed on the internet on Mar. 31, 2017, https://www.youtube.com/watch?v=6LZjaweaXyc> Uploaded/Published Feb. 25, 2012 #.

(56) References Cited

OTHER PUBLICATIONS

Shen J., "Significance, Current Situation and Method of Weather Probability Forecast," Hubei Weather, No. 2, 1996.
Probability of Precipitation, Feb. 23, 2012, URL:<http://web.archive.org/web/20120223192309/https:/ja.wikipedia.org/wiki%E9%99%8dE6%B0%B4%E7%A2%BAE7%8E%87>.
European Search Report from EP Appln. No. 14779873.0, dated Nov. 23, 2016.
European Search Report from EP Appln.No. 14778718.8, dated Nov. 25, 2016.
European Search Report from EP Appln. No. 14779094.3, dated Dec. 8, 2016.
European Search Report from EP Appln. No. 14778742.8, dated Dec. 23, 2016.
Precipitation probability—Wikipedia, https://ja.wikipedia.org/wiki/%/E9%99%8D%E6%B0%B4%E7%A2%BA%E7%8E%87, retrieved from internet on Jun. 22, 2017.
Qhtani, A., (Feb. 25, 2012) "WeatherSpark," located at <https://www.youtube.com/watch?v=6LZiaweaXyc> visited on Jun. 18, 2014. (1 paqe).
Press release. (Oct. 26, 2012) "New AccuWeather App for Windows 8 Takes Users on a Journey," located at <http://www.accuweather.com/en/press/699373>. (3 paqes).
Wikipedia.org. (Mar. 12, 2013) "Weather forecasting," located at <https://web.archive.org/web/20130312014022/http://en.wikipedia.org/wiki/Weather_forecastin Q>. (15 paqes).
LeBlanc, U.S. Appl. No. 13/947,331, filed Jul. 22, 2013, 35 paqes.
LeBlanc, U.S. Appl. No. 14/244,383, filed Apr. 3, 2014, 39 paqes.
LeBlanc, U.S. Appl. No. 13/856,923, filed Apr. 4, 2013, 39 pages.
LeBlanc, U.S. Appl. No. 14/244,516, filed Apr. 3, 2014, 44 paqes.
LeBlanc, U.S. Appl. No. 14/244,586, filed Apr. 3, 2014, 40 pages.
International Search Report and Written Opinion dated Jul. 23, 2014, directed to International Application No. PCT/CA2014/000313; 9 pages.
International Search Report and Written Opinion dated Jul. 24, 2014, directed to International Application No. PCT/CA2014/000330; 10 pages.
International Search Report and Written Opinion dated Jul. 15, 2014, directed to International Application No. PCT/CA2014/000314; 8 paqes.
International Search Report and Written Opinion dated Jul. 11, 2014, directed to International Application No. PCT/CA2014/000317; 12 paqes.
International Search Report and Written Opinion dated Jul. 21, 2014, directed to International Application No. PCT/CA2014/000333; 1 O pages.
International Search Report and Written Opinion dated Jul. 17, 2014, directed to International Application No. PCT/CA20014/000315; 8 paaes.
Mass, Clifford F., "IFPS and the Future of the National Weather Servicer", Forcaster's Forum, American Meteorological Society, 2002 and 2003, p. 76.

METHOD AND SYSTEM FOR DISPLAYING NOWCASTS ALONG A ROUTE MAP

CROSS-REFERENCE TO RELATED APPLICATIONS

This application is a continuation of U.S. patent application Ser. No. 13/922,800, filed Jun. 20, 2013, which claims priority to U.S. Provisional Patent Application No. 61/836,713, filed Jun. 19, 2013, and U.S. Provisional Patent Application No. 61/835,626, filed Jun. 17, 2013, and is a continuation-in-part of U.S. patent application Ser. No. 13/856,923, which was filed on Apr. 4, 2013. The entire contents of the above-referenced patent applications are hereby incorporated by reference.

BACKGROUND

(a) Field

The subject matter disclosed generally relates to a system for determining weather forecasts.

(b) Related Prior Art

Conventional weather forecasting systems provide weather predictions twelve hours to a few days from the present time. If one needs a short term forecast or a forecast with a fine time scale, the best information available usually is an hourly forecast for the day.

Conventional weather forecasts are average forecasts for the area for which they are generated. Thus, a forecast may be inaccurate for a precise location within this area, and even the present weather displayed for an area may differ from the actual weather for a precise location within this area.

Moreover, conventional weather forecasts are displayed at a time scale that is too coarse to allow a user to know when a weather event takes place in a precise location and time. Even for hourly conventional weather forecasts, it is impossible for the user to know if the forecasted weather event lasts one hour or one minute and, for the latter, at what time it takes place exactly within the hour.

There is a need in the market for a method which allow for estimating the weather along the route between the departure location and the destination location so that the user may attempt to take alternative routes to avoid extreme weather conditions.

SUMMARY

The present embodiments describe such a method.

According to an embodiment, there is provided a computer implemented method for generating maps comprising receiving a map request including a departure location and a destination location. In response to receiving said map request, the method comprises obtaining map data which when implemented on a display device cause the display device to show a map including a route drawn between the departure location and said destination location. The method also comprises obtaining nowcasts for one or more key points along said route, modifying said map data including adding a visual indicator representing one of the nowcasts for each key point on the route drawn on the map, and outputting modified map data to a computing device for display to a user.

According to an embodiment, the method further comprises sending a location information associated with each key point to a nowcaster for obtaining nowcasts.

According to an embodiment, the method further comprises sending a time for which the nowcasts are needed for each key point.

According to an embodiment, sending a time comprises sending a current time.

According to an embodiment, sending a time comprises estimating an arrival time representing the time at which the user starting from a current location will arrive at a given key point.

According to an embodiment, estimating the arrival time is based on at least one of: departure time, weather conditions, speed limit, current speed, and distance between the current location and the key point.

According to an embodiment, the method further comprises receiving updated positional information representing the current location of the computing device on which the map is displayed, and using the current location as a new departure location updating the nowcasts on the map.

According to an embodiment, obtaining map data comprises generating the map data using information stored locally.

According to an embodiment, obtaining map data comprises forwarding the map request to a remote server.

In another aspect, there is provided a method for providing nowcasts on a map displayed on a GPS navigation device (GPS), the method comprising receiving from said GPS location information including a departure location and a destination location, and a pre-determined route between the departure location and the destination location, identifying one or more key points along said route, associating a time with each point, obtaining nowcasts for each key points, and forwarding said nowcasts for displaying on the route drawn between the departure location and the destination location, on a display associated with said GPS for display to a user.

According to an embodiment, the method further comprises sending a location information associated with each key point to a nowcaster for obtaining nowcasts.

According to an embodiment, the method further comprises sending a time for which the nowcasts are needed for each key point.

According to an embodiment, sending a time comprises sending a current time.

According to another embodiment, sending a time comprises estimating an arrival time representing the time at which the user starting at a current location will arrive at a given key point.

According to an embodiment, estimating the arrival time is based on at least one of: departure time, weather conditions, speed limit, current speed, and distance between the current location and the key point.

According to an embodiment, the method further comprises receiving updated positional information representing the current location of the GPS on which the map is displayed, and using the current location as a new departure location updating the nowcasts on the map.

Definitions

A nowcaster is a weather forecasting device which prepares very short term (e.g., 1 min., 5 mins., 15 mins., 30 mins., etc.) forecasts for a very small region on Earth (5 meters, 10 meters, 50 meters, 100 meters, 500 meters, 1,000 meters, etc.).

A weather-related observation may be an image, a video, a free form text (tweet, message, email, etc.), a weather value of any sort such as temperature, pressure, visibility, precipitation type and intensity, accumulation, cloud cover, wind, etc.

A weather-related event is, for example, at least one of hail, a wind gust, lightning, a temperature change, etc.

A point observation is an observation, as defined herein, made at a particular position (sometimes also referred to as referred to as a "location") at a given time.

The particular position is the position on Earth at which the observation is made. A precision of 5 meters to 10 meters is appropriate for the embodiments described herein, but the variation in the position may be greater such as 25 meters, 50 meters, 100 meters, 1000 meters or more (i.e., less precision). The means for obtaining the particular position include any type of geo-location means or positioning system available at the time of filing this patent application. The geo-location means or positioning system may be automated or not. Automated geo-location means or positioning system include global positioning systems, RF location systems, radiolocation technologies, Internet Protocol (IP) address, MAC address, WiFi, Radio Frequency Identification (RFID), etc. The positioning systems may also be manual such as providing a street address, street corner, building or landmark, etc.

A given time is defined as the hour, minute and second at which the point observation is made in the time zone corresponding to the particular position. The hour, minute and second for the given time can also be recorded according to Coordinated Universal Time (UTC) or Greenwich Mean Time (GMT) such that the given time is independent of the particular position. The precision of the given time may be more or less than one second. For example, in some embodiments, a precision of 5 s, 10 s, 30 s, 60 s or more may be sufficient for the embodiments described herein.

A user is a person to whom or a machine to which a weather forecast is forwarded.

An observer is an entity providing automated and/or manned observations. An observer may be a person or an automated machine. An observer may also be a user as defined herein.

A gridded image is an image which comprises latitude and longitude coordinates. It is therefore a collection of bi-dimensional geo-localized points/pixels.

Each pixel in a gridded image corresponds to a position and can either represent a single weather value, a probability distribution of values or a level of confidence.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The embodiments will now be described more fully hereinafter with reference to the accompanying drawings, which form a part hereof, and which show, by way of illustration, specific embodiments by which the embodiments may be practiced. The embodiments are also described so that the disclosure conveys the scope of the invention to those skilled in the art. The embodiments may, however, be embodied in many different forms and should not be construed as limited to the embodiments set forth herein.

Among other things, the present embodiments may be embodied as methods or devices. Accordingly, the embodiments may take the form of an entirely hardware embodiment, an entirely software embodiment, an embodiment combining software and hardware aspects, etc. Furthermore, although the embodiments are described with reference to a portable or handheld device, they may also be implemented on desktops, laptop computers, tablet devices or any computing device having sufficient computing resources to implement the embodiments.

Briefly stated, the present embodiments describe a system and method for displaying nowcasts along a route on a map. The system receives a map request including a departure location and a destination location from a user, and obtains map data including a route between the destination location and the departure location. A nowcaster is used for outputting nowcasts for a number of key points along the route. The system modifies the map data to include a visual indicator for the nowcast associated with each key point such that when the modified map data is executed on a display the nowcasts are displayed along the route between the departure location and the destination location.

Figure 1:
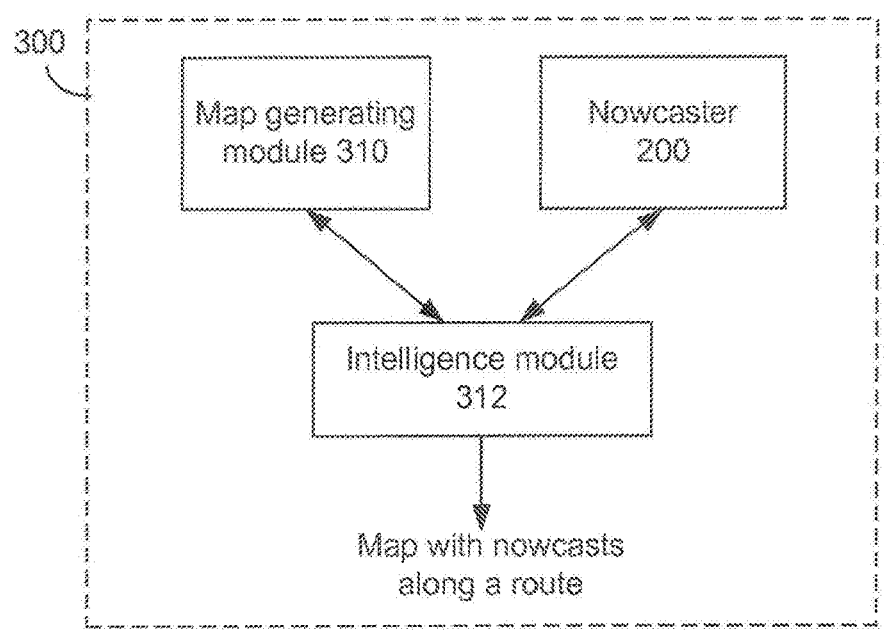
FIG. 1 is a block diagram of system for displaying nowcasts along a route on a map.

FIG. 1 is a block diagram of system 300 for displaying nowcasts along a route on a map. As shown in FIG. 1, the system 300 comprises a nowcaster 200 (aka system for generating nowcasts), a map generating module 310, and an intelligence module 312 for communicating between the map generating module 310 and the nowcaster 200 to output a map showing nowcasts for a number of key points along the route.

Nowcaster

Figure 2:
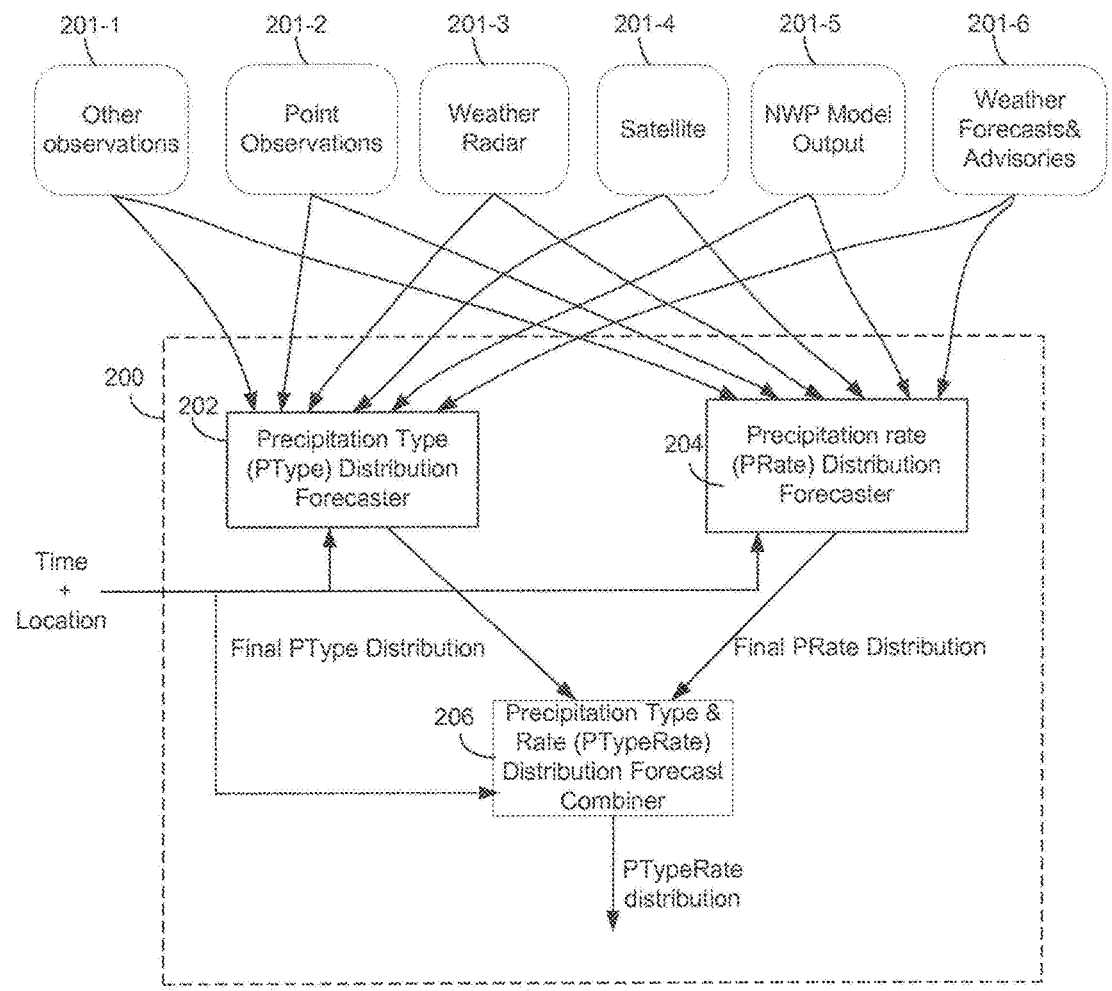
FIG. 2 is a block diagram of a suitable nowcaster for implementing the embodiments.

FIG. 2 is a block diagram of a suitable nowcaster 200 such as that described in co-owned and co-invented U.S. patent application Ser. No. 13/856,923 filed on Apr. 4, 2013.

As shown in FIG. 2, the nowcaster 200 receives weather observations from different sources 201 such as weather observations sources including but not limited to: point observations 201-2 (e.g. feedback provided by users and automated stations), weather radars 201-3, satellites 201-4 and other types of weather observations 201-1, and weather forecast sources such as numerical weather prediction (NWP) model output 201-5 and weather forecasts and advisories 201-6.

In an embodiment, the nowcaster 200 comprises a PType distribution forecaster 202 and a PRate distribution forecaster 204. The PType forecaster 202 receives the weather observations from the different sources 201 and outputs a probability distribution of precipitation type over an interval of time, for a given latitude and longitude (and/or location). For example:
 a. Snow: 10%
 b. Rain: 30%
 c. Freezing Rain: 60%
 d. Hail: 0%
 e. Ice Pellets: 0%

Similarly, the PRate forecaster 204 receives the weather observations for a given latitude and longitude from the different sources 201 and outputs a probability distribution forecast of a precipitation rate (PRate) in a representation that expresses the uncertainty. For example, the PRate may be output as a probability distribution of precipitation rates or a range of rates over an interval of time, for a given latitude and longitude. For example:
 f. No Precip: 30%
 g. Light: 40%
 h. Moderate: 20%
 i. Heavy: 10%

The PRate and PType values output by the PRate forecaster 204 and the PType forecaster 202 are sent to a forecast combiner 206 to combine these values into a single value PTypeRate which represents the precipitation outcomes. For example, if the value of PType is "Snow", and the value of "PRate" is heavy, the combined value of PTypeRate may be "heavy snow".

For a given latitude and longitude, the system outputs forecasted PTypeRate Distributions for predefined time intervals, either fixed (ex: 1 minute) or variable (ex: 1 minute, then 5 minutes, then 10 minutes, etc). The system can either pre-calculate and store forecasted PTypeRate Distributions in a sequence of time intervals, or calculate it on the fly. A PTypeRate Distribution represents, for each time interval, the certainty or uncertainty that a PTypeRate will occur.

With reference to FIG. 2, the forecast combiner 206 receives the final PRate distribution from the PType forecaster 202 and the final PRate distribution from the PRate forecaster 204 to combine them into a group of PTypeRate distribution values each representing the probability of receiving a certain type of precipitation at a certain rate. An example is provided below.

Assuming that the PType distribution is as follows: Snow: 50%, Rain 0%, Freezing rain: 30%, Hail 0%, Ice pellets 20%, and the PRate distribution is as follows: None: 0%, light: 10%, moderate: 20%, Heavy: 30%, Very heavy 40%, the PTypeRate distributions may be as follows:

|  | PType | | | | |
| --- | --- | --- | --- | --- | --- |
| PRate | Snow 50% | Rain 0% | Freez. Rain 30% | Hail 0% | Ice Pellets 20% |
| None 0% | No precipitation | No precipitation | No precipitation | No precipitation | No precipitation |
| Light 10% | 5% light snow | No precipitation | 3% light freezing rain | No precipitation | 2% light ice pellets |
| Moderate 20% | 10% moderate snow | No precipitation | 6% moderate freezing rain | No precipitation | 4% moderate ice pellets |
| Heavy 30% | 15% heavy snow | No precipitation | 9% heavy freezing rain | No precipitation | 6% heavy ice pellets |
| V. heavy 40% | 20% heavy snow | No precipitation | 12% v. heavy freezing rain | No precipitation | 8% v. heavy ice pellets |

Accordingly, the forecast combiner 206 multiplies the probability of each type of precipitation by the probability of each rate of precipitation to obtain a probability of receiving a certain type of precipitation at a certain rate for example, 20% chance of heavy snow, or 12% chance of very heavy freezing rain. In an embodiment, it is possible to associate probability ranges with textual information for displaying the textual information to the user instead of the probabilities in numbers. For example, probabilities that are between 5% and 15% may be associated with the text: "low chance", while probabilities that are between 40% and 70% may be associated with the text "high chance", or "very likely" etc. whereby, instead of displaying: 60% chance of heavy snow, it is possible to display: "high chance of heavy snow".

In another embodiment, it is possible to combine two or more different PTypeRates along one or more dimensions (the dimensions including: the rate, type, or probability). For example, results of such combination may include: Likely light to moderate rain, Likely light to moderate rain or heavy snow; Likely moderate rain or snow; likely rain or snow; chance of light to moderate rain or heavy snow or light hail; chance of moderate rain, snow or hail; chance of rain, snow or hail, etc.

Accordingly, the nowcaster 200 receives the location for which the nowcasts are needed and the time and/or time interval for which the nowcasts are needed and outputs the PtypRate distribution for the given location and for the specific time.

Map Generation Module

The map generating module 310 may be a web-based module and/or a GPS based module for generating routes and directions.

Figure 3A:
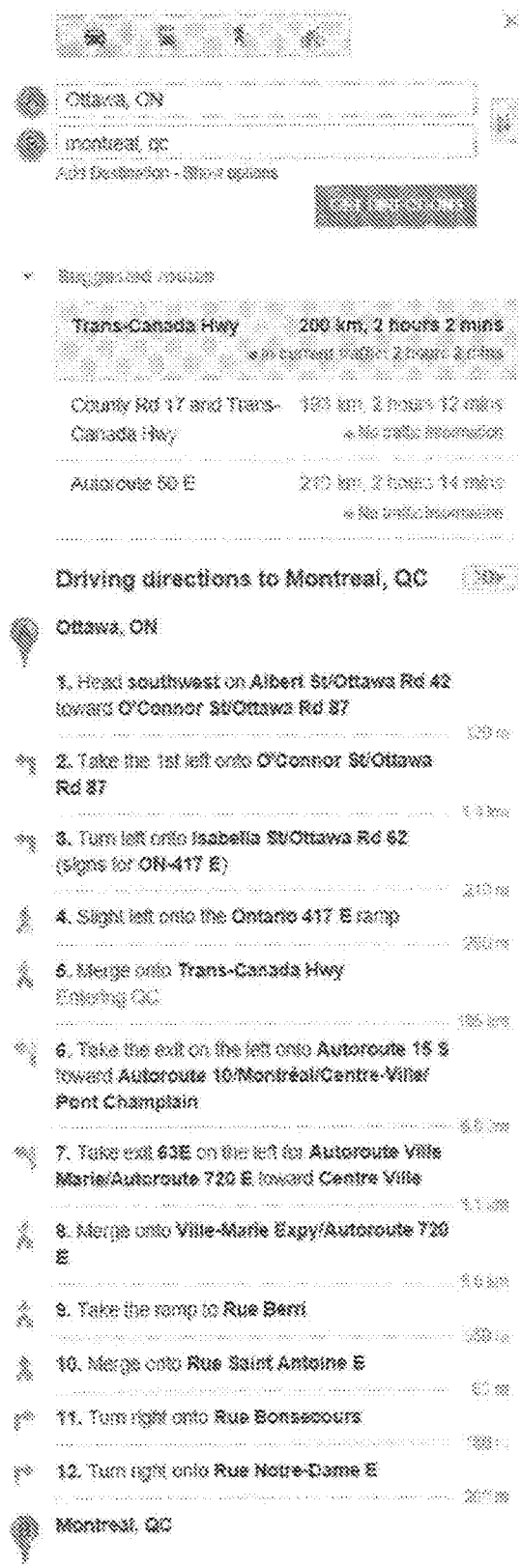
FIGS. 3a to 3c illustrate examples of maps and directions returned by a map generating module.
Figures 3B, 3C:
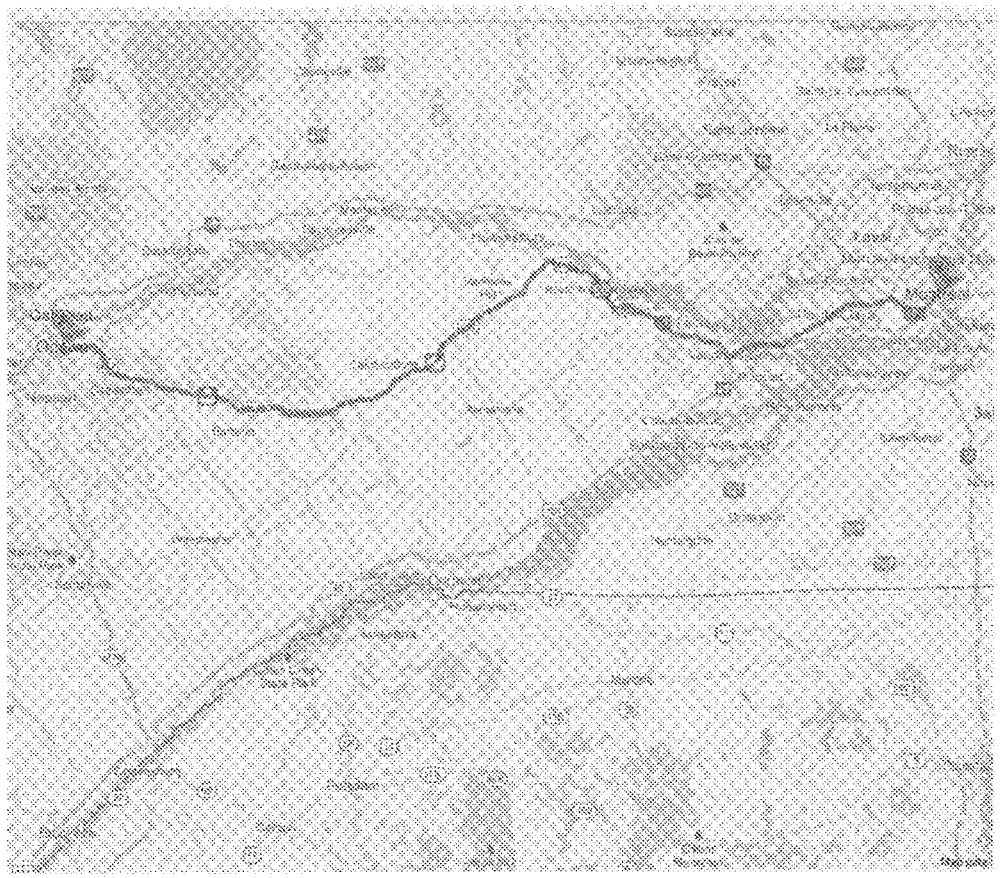

An example of such web-based modules may include Mapquest™, Yahoo™ Maps, Google™ Maps, and so on. In this type of modules the data relating to the generation or routes and/or maps is stored on a remote server 250 that is accessible via a telecommunications network 254 such the internet. Using these modules, the user may request to view the map for a certain location e.g. city, town, country, street etc. and/or may request directions from a first location A to a second location B, whereby the module may return a list of directions for the displacement from A to B as shown in FIG. 3a and/or a route drawn on a map as shown in FIG. 3b. In an embodiment the map generating module 310 may provide one or more choices of routes for the user to choose from as exemplified in FIG. 3c.

In another embodiment, the data may be downloaded and/or pushed from the server 250 to the computing device on which the embodiments are practiced, whereby the route and/or map may be displayed without accessing the remote server 250.

Figure 4:
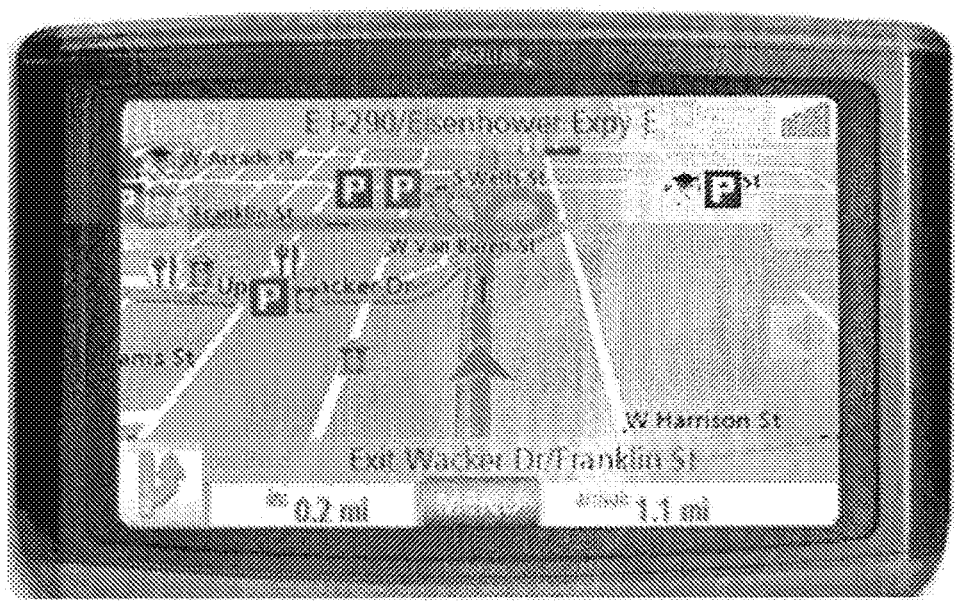
FIG. 4 illustrates an example of a GPS navigating device.

In an embodiment, the map generating module 310 may also include a GPS navigation device 330 which determines the current position of the user using a connection with satellite 332. The GPS unit may be embedded in a portable device such as an IPhone™ or the like. In another example, the GPS navigation device 330 may be embedded in a handheld GPS navigation device such as the series of devices manufactured by Garmin™ or Magellan™ etc. An example of which is shown in FIG. 4.

Intelligence Module

In an embodiment, the intelligence module 312 may be linked to a user interface for receiving the user's entries such the identification of the locations A and B, departure time, and the user preferences regarding the locations for which the nowcasts are needed.

The intelligence module 312 transfers the identification of the locations A and B to the map generating module 310, and in return, it receives a map on which the route between A and B is drawn as exemplified in FIG. 3b.

Figure 5A:
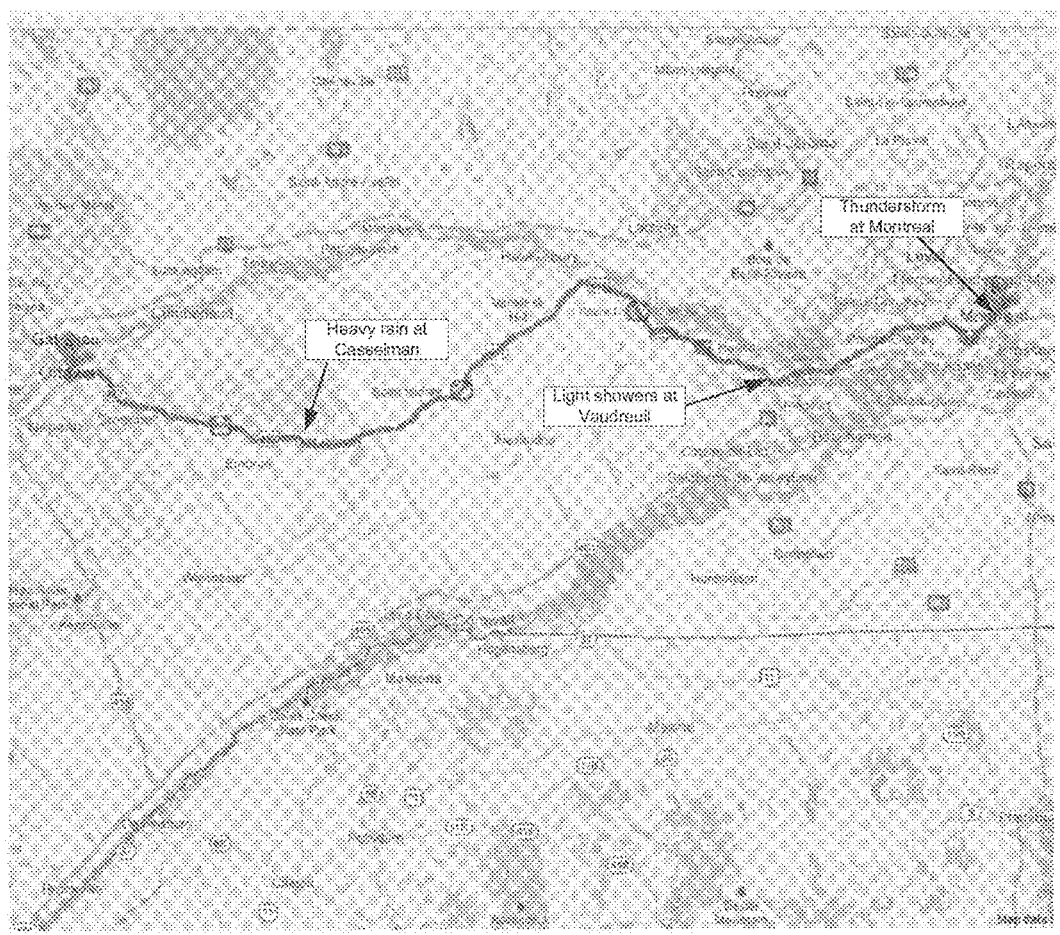
FIGS. 5a & 5b illustrate examples of maps showing a route and a plurality nowcasts for a plurality of key points along the route.

Based on the user's preferences, the intelligence module 312 may identify/receive the key points along the route. For example, the user may choose to view the nowcasts for major cities along the route, or by increments of for example 30 Km, etc. The intelligence module 312 sends the location information associated with each key point to the nowcaster 200 along with a time or time interval. In response, the Intelligence module 312 receives the nowcasts from the nowcaster 200 and adds some or all (depending on the resolution and size of the display and the zoom level) of these nowcasts on the map received from the map generating module 310, as exemplified in FIG. 5a.

In one embodiment, the intelligence module 312 may send the location information of the each key point along with the current time whereby the user may see the current weather conditions in the different locations along the route.

In another embodiment, the intelligence module 312 may estimate a time of arrival for each key point which represents the estimated time at which the user is expected to arrive at a given key point. Estimation of the arrival time may depend on several factors including: the departure time (which unless specified by the user is taken as the present time), the distance between the departure point and the respective key point, traffic information received from the map generating module 310 (or another source), weather information, current speed, and speed limit associated with each segment of the route between the current position and the respective key point.

As discussed above, the map generating module 310 may provide different choices of routes whereby the user may view the weather conditions along different key points and select one the routes for navigation.

In an embodiment, if the user is viewing the map using a GPS and/or web enabled computing device, the nowcasts may be updated on the map based on the advancement of the user on the route and the changes in weather conditions.

Figure 5B:
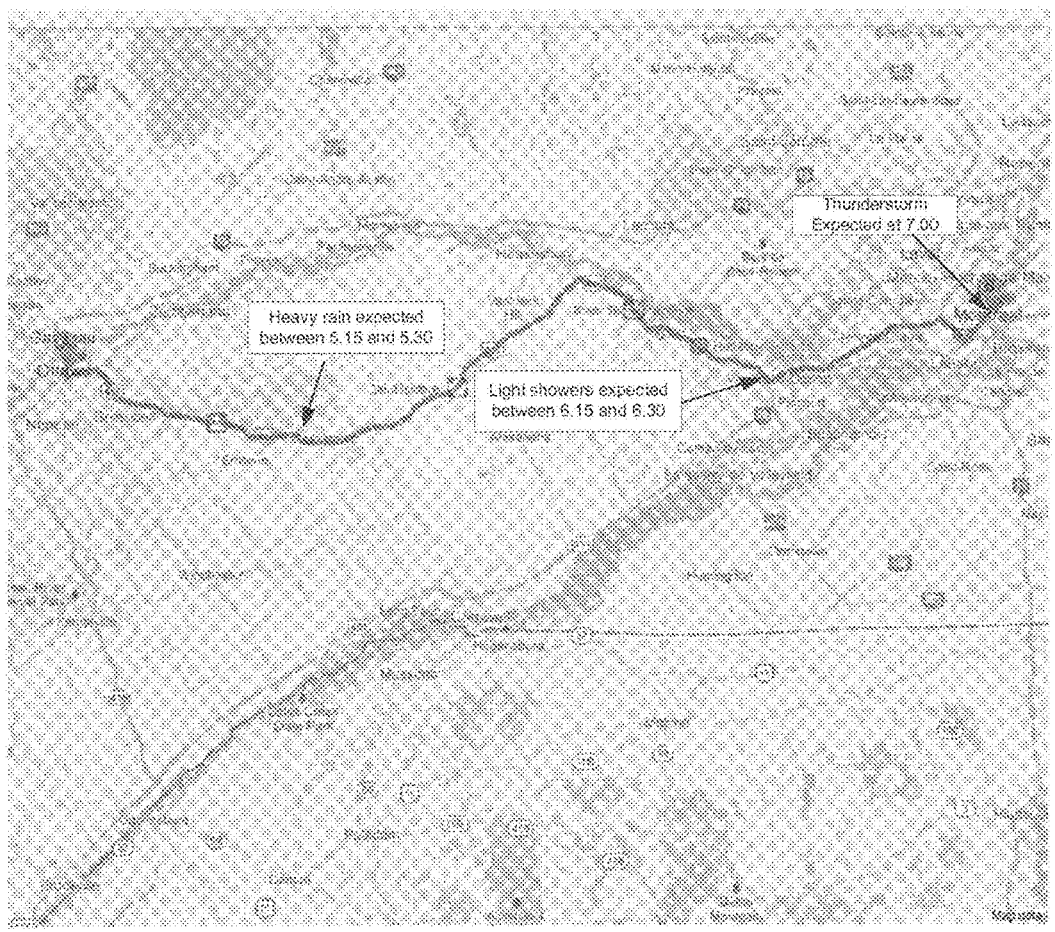

In an embodiment, the nowcasts may be provided on the map along with the time/time interval associated with each nowcast, as exemplified in FIG. 5b. In an embodiment, the time shown on the map is the estimated time of arrival which is estimated by the intelligence module 312 based on the current location, speed, and weather and traffic conditions.

Figure 6:
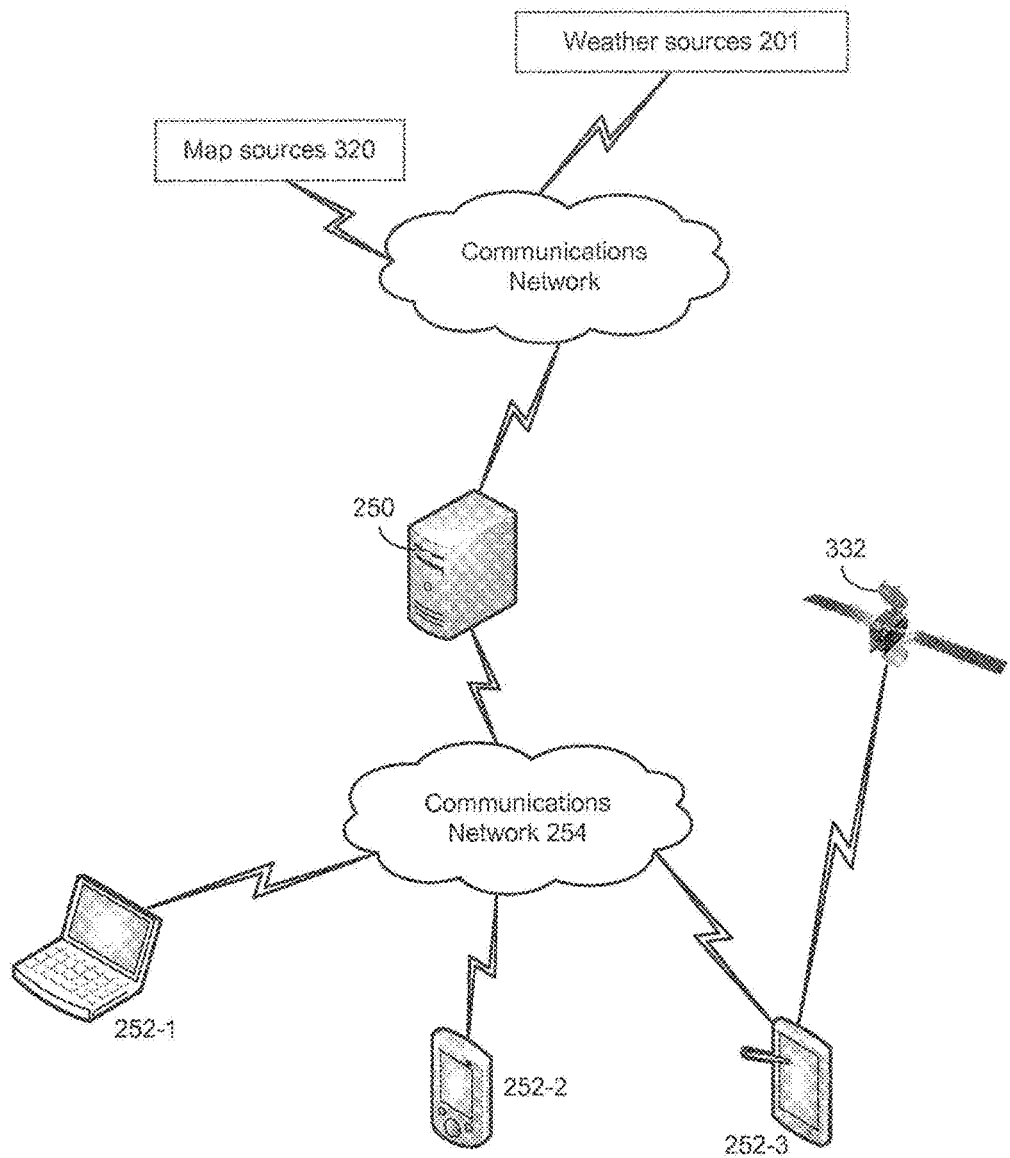
FIG. 6 is an example of a network environment in which the embodiments may be practiced.

FIG. 6 is an example of a network environment in which the embodiments may be practiced. The nowcaster 200 may be implemented on a server 250 which is accessible by a plurality of client computers 252 over a telecommunications network 254. The client computers 252 may include but not limited to: laptops, desktops, portable computing devices, tablets and the like. Using a client computer 252, each user may enter the directions between two locations and preferably the time of departure (otherwise the current time is used to replace this). The information is sent to the remote server 250 over a telecommunications network 254. The server 250 returns a list of directions along with a map including a route from locations A to B along with nowcasts at certain key points on the route. The server accesses weather source 201 over a telecommunications network 254 as discussed in connection with FIG. 2. The server 250 may have map data stored thereon and may also access map sources 320 provided by a third entity.

Preferably, the client computer 252 is GPS enabled. In which case, the computing device may provide updates to the server 250 for updating the nowcasts along the route, as discussed above.

Figure 7:
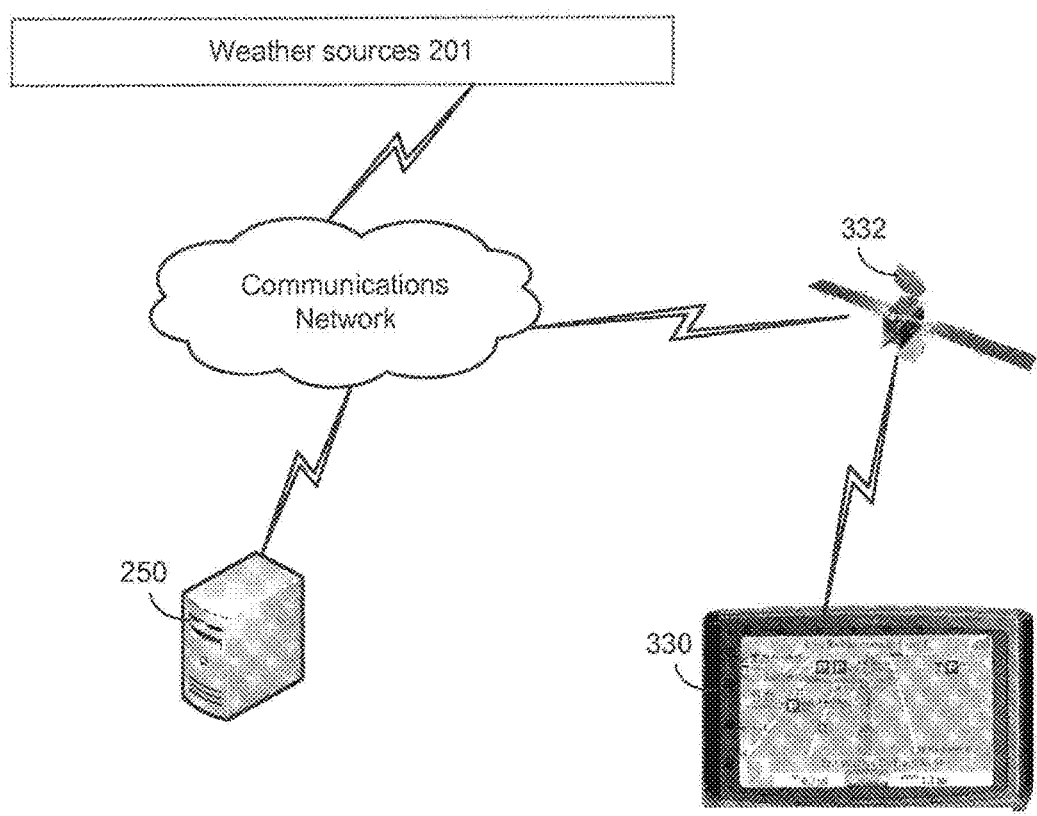
FIG. 7 is an example of another network environment in which the embodiments may be practiced.

FIG. 7 is an example of another network environment in which the embodiments of a method for providing nowcasts may be practiced. In this embodiment, the user enters the destination and views the map on a GPS navigation device. The GPS navigation device takes the departure location as the current location. The current position and the end destination along with a pre-determined route which is chosen by a satellite 332 may be sent to the server 250 via the satellite 332. The intelligence module 312 implemented in the server 250 may return the nowcasts for key points along the route, and send the nowcasts and an identification of the key points to the GPS navigation device 330 for adding to the map shown on the display of the GPS navigation device 330.

Figure 8:
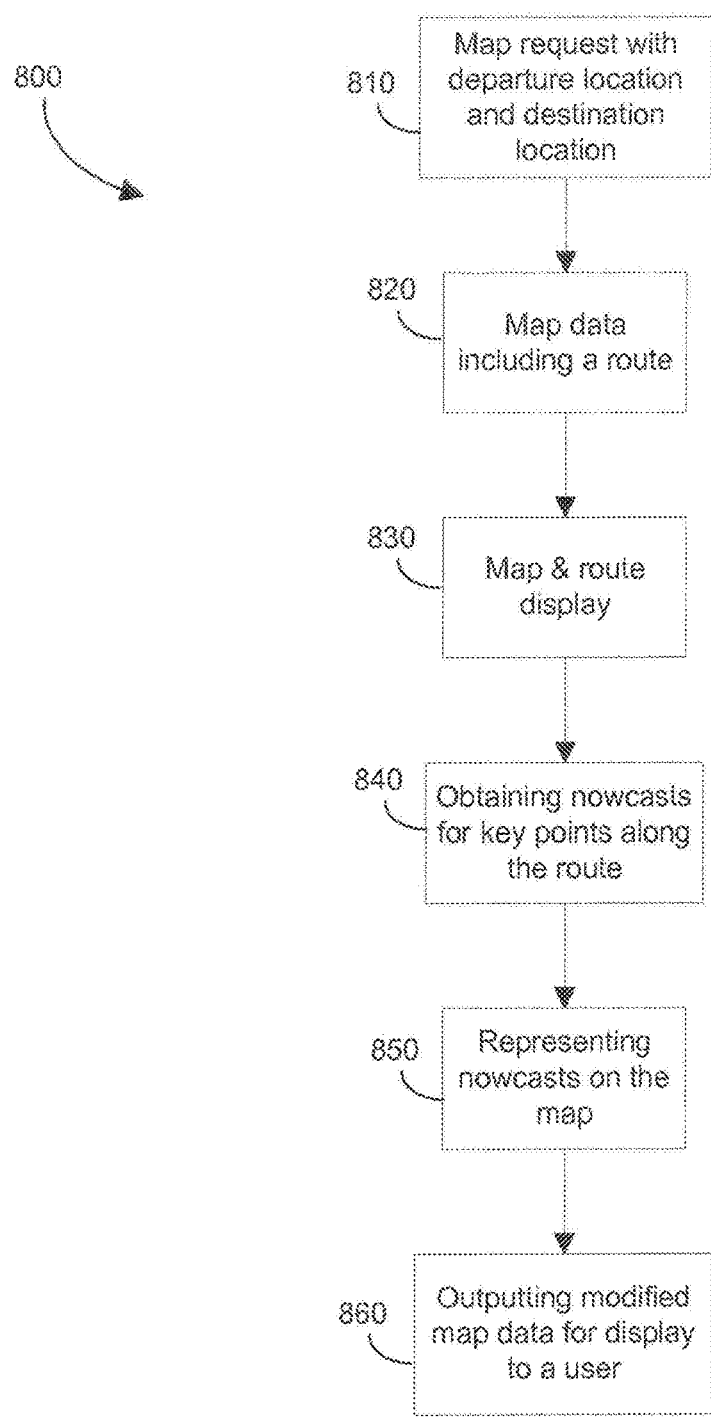
FIG. 8 is a flowchart of a computer-implemented method for generating maps, according to an embodiment.

FIG. 8 illustrates a computer implemented method 800 for generating maps. It comprises receiving a map request 810 including a departure location and a destination location. In response to receiving the map request 810, the computer implemented method 800 comprises obtaining map data 820 which, when implemented on a display device, cause the display device to show a map display 830 including a route drawn between the departure location and said destination location. It also performs obtaining nowcasts 840 for one or more key points along the route and modifies the map data 820 (including adding a visual indicator) for the representation 850 of one of the nowcasts for each key point on the route drawn on the map. The computer-implemented method 800 eventually outputs modified map data for display 860 to a user.

Hardware and Operating Environment

Figure 9:
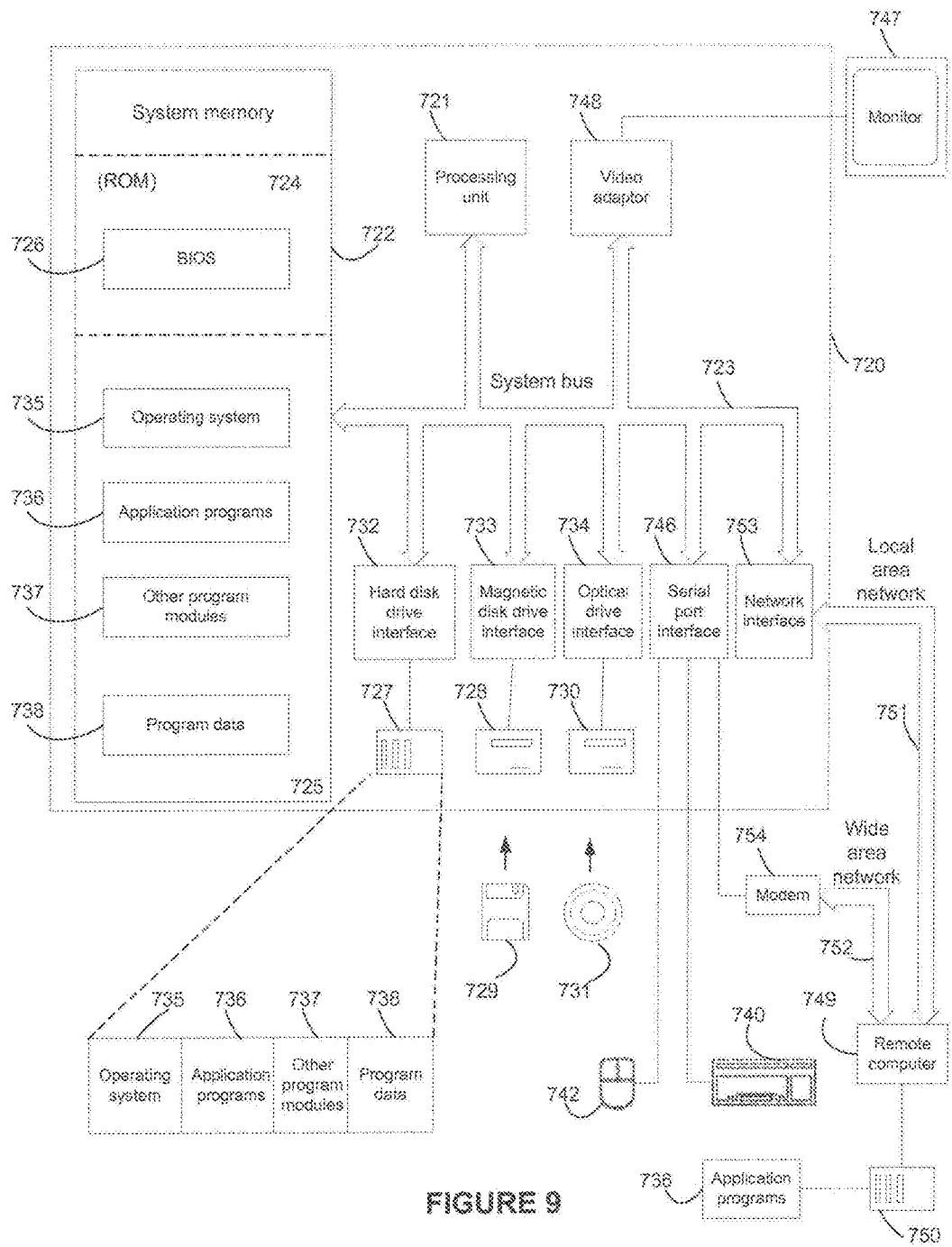
FIG. 9 illustrates an exemplary diagram of a suitable computing operating environment in which embodiments of the invention may be practiced.

FIG. 9 illustrates an exemplary diagram of a suitable computing operating environment in which embodiments of the invention may be practiced. The following description is associated with FIG. 9 and is intended to provide a brief, general description of suitable computer hardware and a suitable computing environment in conjunction with which the embodiments may be implemented. Not all the components are required to practice the embodiments, and variations in the arrangement and type of the components may be made without departing from the spirit or scope of the embodiments.

Although not required, the embodiments are described in the general context of computer-executable instructions, such as program modules, being executed by a computer, such as a personal computer, a hand-held or palm-size computer, Smartphone, or an embedded system such as a computer in a consumer device or specialized industrial controller. Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, cellular telephones, smart phones, display pagers, radio frequency (RF) devices, infrared (IR) devices, Personal Digital Assistants (PDAs), laptop computers, wearable computers, tablet computers, a device of the IPOD or IPAD family of devices manufactured by Apple Computer, integrated devices combining one or more of the preceding devices, or any other computing device capable of performing the methods and systems described herein. The embodiments may also be practiced in distributed computing environments where tasks are performed by remote processing devices that are linked through a communications network. In a distributed computing environment, program modules may be located in both local and remote memory storage devices.

The exemplary hardware and operating environment of FIG. 9 includes a general purpose computing device in the form of a computer 720, including a processing unit 721, a system memory 722, and a system bus 723 that operatively couples various system components including the system memory to the processing unit 721. There may be only one or there may be more than one processing unit 721, such that the processor of computer 720 comprises a single central-processing unit (CPU), or a plurality of processing units, commonly referred to as a parallel processing environment. The computer 720 may be a conventional computer, a distributed computer, or any other type of computer; the embodiments are not so limited.

The system bus 723 may be any of several types of bus structures including a memory bus or memory controller, a peripheral bus, and a local bus using any of a variety of bus architectures. The system memory may also be referred to as simply the memory, and includes read only memory (ROM) 724 and random access memory (RAM) 725. A basic input/output system (BIOS) 726, containing the basic routines that help to transfer information between elements within the computer 720, such as during start-up, is stored in ROM 724. In one embodiment of the invention, the computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. In alternative embodiments of the invention, the functionality provided by the hard disk drive 727, magnetic disk 729 and optical disk drive 730 is emulated using volatile or non-volatile RAM in order to conserve power and reduce the size of the system. In these alternative embodiments, the RAM may be fixed in the computer system, or it may be a removable RAM device, such as a Compact Flash memory card.

In an embodiment of the invention, the hard disk drive 727, magnetic disk drive 728, and optical disk drive 730 are connected to the system bus 723 by a hard disk drive interface 732, a magnetic disk drive interface 733, and an optical disk drive interface 734, respectively. The drives and their associated computer-readable media provide nonvolatile storage of computer-readable instructions, data structures, program modules and other data for the computer 720. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 729, optical disk 731, ROM 724, or RAM 725, including an operating system 735, one or more application programs 736, other program modules 737, and program data 738. A user may enter commands and information into the personal computer 720 through input devices such as a keyboard 740 and pointing device 742. Other input devices (not shown) may include a microphone, joystick, game pad, satellite dish, scanner, touch sensitive pad, or the like. These and other input devices are often connected to the processing unit 721 through a serial port interface 746 that is coupled to the system bus, but may be connected by other interfaces, such as a parallel port, game port, or a universal serial bus (USB). In addition, input to the system may be provided by a microphone to receive audio input.

A monitor 747 or other type of display device is also connected to the system bus 723 via an interface, such as a video adapter 748. In one embodiment of the invention, the monitor comprises a Liquid Crystal Display (LCD). In addition to the monitor, computers typically include other peripheral output devices (not shown), such as speakers and printers. The monitor may include a touch sensitive surface which allows the user to interface with the computer by pressing on or touching the surface.

The computer 720 may operate in a networked environment using logical connections to one or more remote computers, such as a remote computer 749. These logical connections are achieved by a communication device coupled to or a part of the computer 720; the embodiment is not limited to a particular type of communications device. The remote computer 749 may be another computer, a server, a router, a network PC, a client, a peer device or other common network node, and typically includes many or all of the elements described above relative to the computer 720, although only a memory storage device 750 has been illustrated in FIG. 6. The logical connections depicted in FIG. 6 include a local-area network (LAN) 751 and a wide-area network (WAN) 752. Such networking environments are commonplace in offices, enterprise-wide computer networks, intranets and the Internet.

When used in a LAN-networking environment, the computer 720 is connected to the local network 751 through a network interface or adapter 753, which is one type of communications device. When used in a WAN-networking environment, the computer 720 typically includes a modem 754, a type of communications device, or any other type of communications device for establishing communications over the wide area network 752, such as the Internet. The modem 754, which may be internal or external, is connected to the system bus 723 via the serial port interface 746. In a networked environment, program modules depicted relative to the personal computer 720, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer a hand-held or palm-size computer, a computer in an embedded system, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A computer implemented method for generating a map comprising a weather forecast, the method comprising:
   receiving, at a navigation device, a map request including a departure location and a destination location;
   in response to receiving the map request, obtaining map data associated with a route between the departure location and the destination location;
   generating a weather forecast indicating a probability of a particular type of precipitation occurring at a particular rate at a point along the route at an estimated arrival time associated with the point by combining a probability of the particular type of precipitation occurring and a probability of precipitation occurring at the particular rate; and
   displaying, on a display device of the navigation device, a map of the route and a visual indicator of the weather forecast.

2. The method of claim 1, wherein obtaining the weather forecast comprises:
   sending location information associated with the point to a remote server; and
   receiving the weather forecast from the remote server.

3. The method of claim 2, wherein obtaining the weather forecast further comprises sending, to the remote server, the estimated arrival time.

4. The method of claim 3, further comprising:
   determining the estimated arrival time based on a current time, a distance between the point and the departure location, and another weather forecast.

5. The method of claim 1, wherein the weather forecast further indicates a second probability of a second particular type of precipitation occurring at a second particular rate at the point at the estimated arrival time.

6. The method of claim 1, further comprising:
   selecting the point based on stored user preferences;
   identifying a second point along the route based on the stored user preferences; and
   obtaining a second weather forecast indicating a second probability of the particular type of precipitation occurring at the particular rate at the second point at a second estimated time of arrival associated with the second point, wherein the stored user preferences identify an increment between the point and the second point.

7. The method of claim 6, further comprising:
   obtaining an updated weather forecast for the point based on advancement of the navigation device on the route and changes in weather conditions; and
   displaying, on the display device, a modified map that includes a second visual indicator representing the updated weather forecast.

8. The method of claim 1, wherein the map data is generated using information stored locally.

9. The method of claim 1, further comprising:
   forwarding the map request to a remote server; and
   receiving the map data from the remote server.

10. The method of claim 1, further comprising:
    selecting the point based on stored user preferences, wherein the stored user preferences indicate that a user prefers to receive weather forecasts associated with major cities.

11. The method of claim 1, wherein the particular type of precipitation is hail.

12. The method of claim 1, wherein the weather forecast is associated with a 1-minute interval.

13. A device for generating a map comprising a weather forecast, the device comprising:
    a display device;
    one or more processors; and
    a memory storing instructions for the one or more processors,
    wherein, when the one or more processors execute the instructions stored in the memory, the device is caused to:
       receive a map request indicating a departure location and a destination location;
       in response to receiving the map request, obtain map data associated with a route between the departure location and the destination location;
       obtain a weather forecast indicating a probability of a particular type of precipitation occurring at a particular rate at a point along the route at an estimated arrival time associated with the point, wherein the probability of the particular type of precipitation occurring at the particular rate is generated by combining a probability of the particular type of precipitation occurring and a probability of precipitation occurring at the particular rate; and
       display a map of the route and a visual indicator of the weather forecast on the display device.

14. The device of claim 13, wherein the point is selected based on stored user preferences and the stored user preferences indicate a preference for weather forecasts associated with major cities or identifying an interval between points.

15. A non-transitory computer readable medium storing instructions that, when executed by a processor, cause it to:
    receive, at a navigation device, a map request including a departure location and a destination location;
    in response to receiving the map request, obtain map data associated with a route between the departure location and the destination location;
    generate a weather forecast indicating a probability of a particular type of precipitation occurring at a particular rate at a point along the route at an estimated arrival time associated with the point by combining a probability of the particular type of precipitation occurring and a probability of precipitation occurring at the particular rate; and display, on a display device of the navigation device, a map of the route and a visual indicator of the weather forecast.

\* \* \* \* \*